March 10, 1970        V. RONKA        3,500,175
ELECTROMAGNETIC PROSPECTING APPARATUS UTILIZING VLF RADIO FIELDS
Filed April 21, 1967        2 Sheets-Sheet 1

INVENTOR.
VAINO RONKA
BY Rogers, Bereskin & Parr

INVENTOR.
VAINO RONKA
BY
Rogers, Bereskin & Parr

United States Patent Office 3,500,175
Patented Mar. 10, 1970

3,500,175
ELECTROMAGNETIC PROSPECTING APPARATUS UTILIZING VLF RADIO FIELDS
Vaino Ronka, Don Mills, Ontario, Canada, assignor to Geonics Limited, Toronto, Ontario, Canada, a corporation of Canada
Filed Apr. 21, 1967, Ser. No. 632,656
Claims priority, application Canada, June 9, 1966, 962,480
Int. Cl. G01v 3/00, 3/12
U.S. Cl. 324—3                    12 Claims

ABSTRACT OF THE DISCLOSURE

A portable electromagnetic prospecting apparatus utilizing existing very low frequency (VLF) transmitters as sources of primary field. The apparatus includes a receiving coil, a reference coil orthogonal to the receiving coil, and a sensitive receiver tuned to the frequency of a particular VLF transmitter. The receiving coil is tilted from the vertical unit a null is observed, and then a measured percentage of the output of the reference coil, after being phase shifted 90°, is fed into the receiver to balance any voltage induced in the receiving coil due to quadrature components. The tilt angle of the receiving coil is a measure of the vertical real component of the secondary field, and the measured percentage of the phase shifted reference coil output is a measure of the vertical quadrature component of the secondary field.

---

Figure 1:
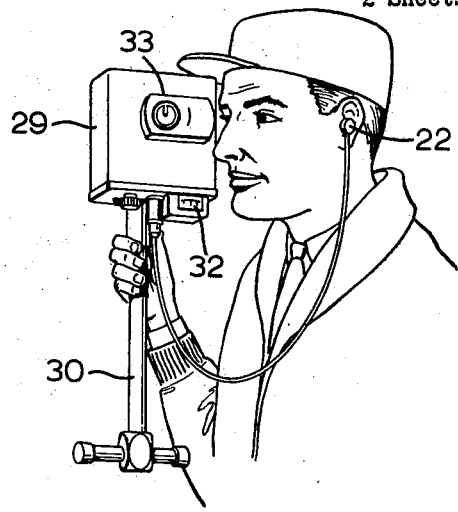

This invention relates to an electromagnetic prospecting apparatus for detecting electrically conductive buried ore bodies.

It is usual in electromagnetic prospecting to establish a primary alternating magnetic field in the earth and to measure real and quadrature components of secondary magnetic fields emanating from electrically conductive ore bodies such as massive sulphides when they are intersected by the primary field. The real components are in phase or 180° out of phase with the primary field and the quadrature components are 90° out of phase with the primary field. The real and quadrature components are indicative of the character and quality of buried ore bodies.

Conventional electromagnetic prospecting systems usually employ a local electromagnetic transmitter for producing the primary field and a sensitive receiver for detecting the secondary fields. The transmitter presents problems of weight and power consumption. In addition, careful precautions are necessary to separate the real components of the secondary fields from the primary field. Another kind of prospecting system, called the AF-MAG system, measures the tilt of the plane of polarization of naturally occurring electromagnetic fields. The source of these fields appears to largely be associated with thunderstorms. The AF-MAG system is said to offer greater depth of penetration than conventional electromagnetic systems because the source is theoretically at infinity, but a serious disadvantage is that the AF-MAG system relies on natural electromagnetic fields which vary daily as well as seasonally. As a result, there are daily and seasonal periods when it is not practical to conduct a survey.

The apparatus of the present invention preferably utilizes distant very low frequency (VLF) radio stations as sources of primary fields. The antennas of such stations are generally vertical, and the flow of antenna current produces a horizontal magnetic field which deeply penetrates the earth and which can be detected at substantial distances from the radio station. Relatively deep ore bodies can be detected with the apparatus, and as no local transmitter is required, there is a considerable saving in weight and power. A preferred form of the invention includes a receiving coil, a reference coil preferably orthogonal to the receiving coil, and a sensitive receiver tuned to the VLF frequency band. The receiving coil is tilted from the vertical until a minimum is observed in the output of the receiver. Then a measured amplitude of the voltage induced in the reference coil, after being shifted 90° in phase, is fed into the receiver to balance any voltage induced in the receiving coil due to quadrature components. The inclination or tilt angle of the receiving coil is proportional to the amplitude of the vertical real component of the secondary field, and the amplitude of the phase shifted voltage from the reference coil is proportional to the amplitude of the vertical quadrature component of the secondary field. As the voltage induced in the receiving coil is balanced for both in-phase and out of phase voltages, a very sharp null is observed in the receiver output, and this results in high measurement accuracy.

Objects of the invention are therefore to provide electromagnetic prospecting apparatus that is sensitive, efficient, and portable.

Figure 2:
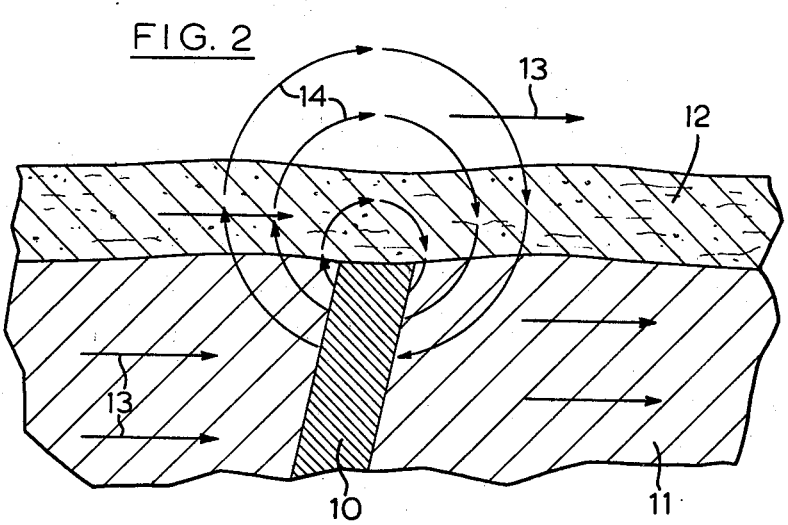
Figure 3:
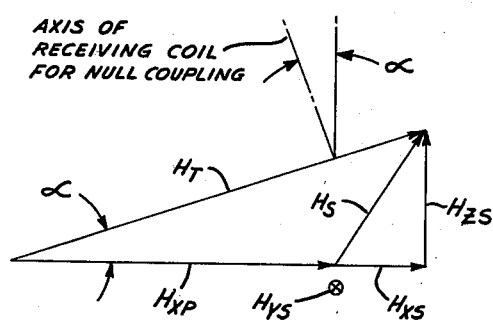
Figure 4:
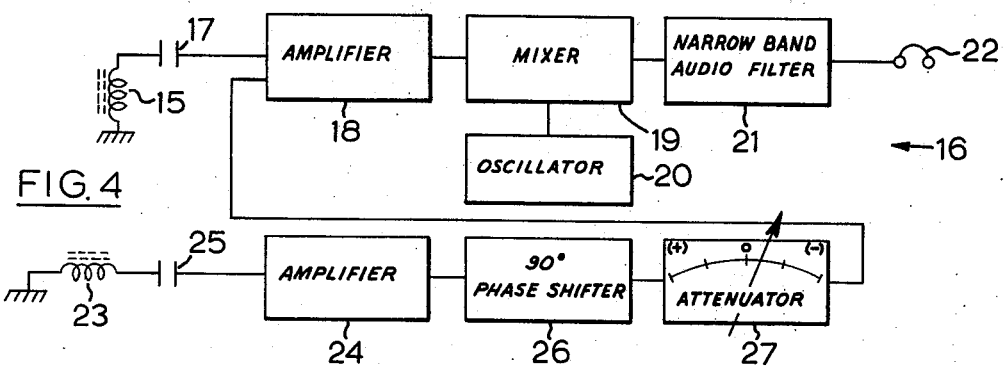
Figure 5:
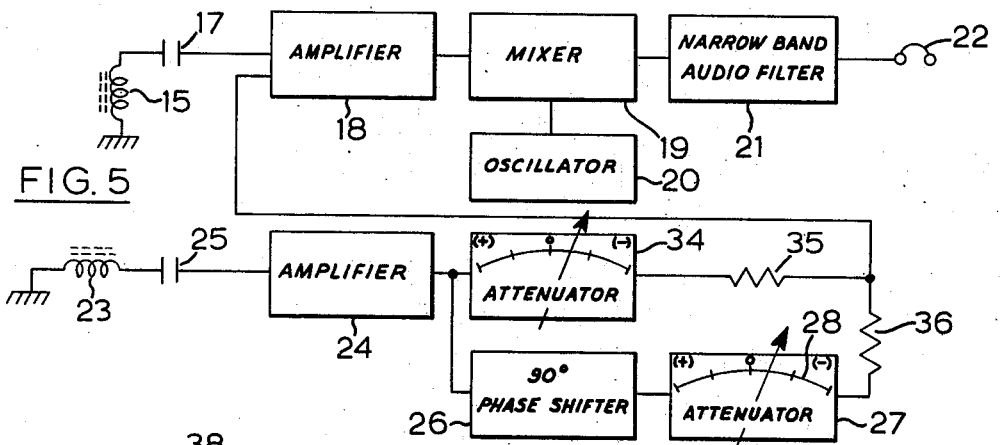
Figure 6:
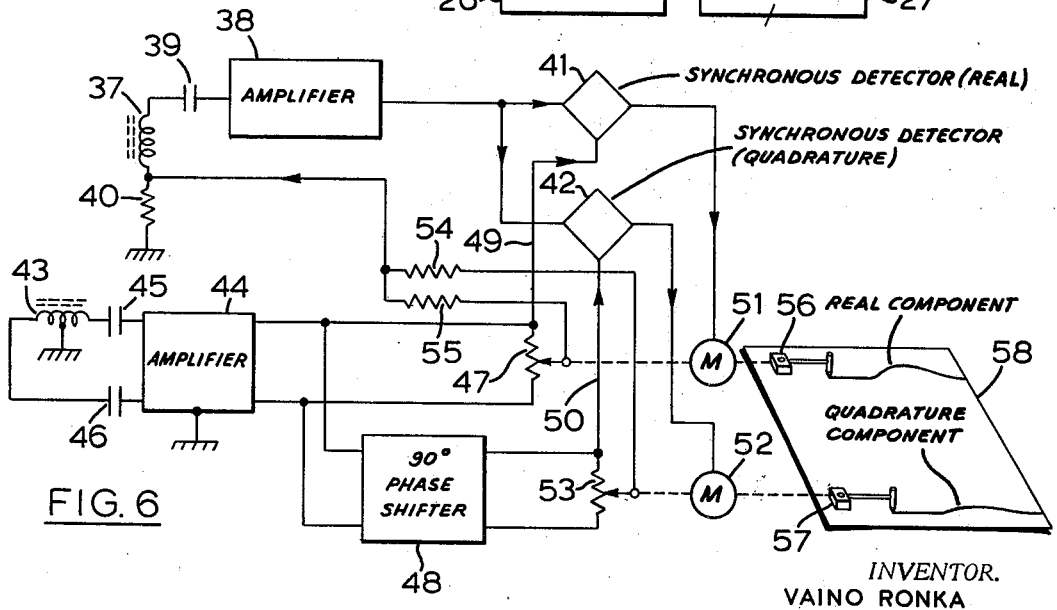

Preferred embodiments of the invention are illustrated in the accompanying drawings, wherein:

FIG. 1 is a pictorial view showing a preferred form of the invention,

FIG. 2 is a sectional view of the earth showing somewhat diagrammatically a portion of a secondary magnetic field surrounding a buried ore body, FIG. 3 is a vector diagram representing the summation of a primary field and the real component of a secondary field, FIG. 4 is a block diagram of the apparatus shown in FIG. 1, FIG. 5 is a block diagram of another form of the invention, and FIG. 6 is a block diagram of a form of the invention that is particularly adapted for airborne use.

The principles upon which the art of electromagnetic prospecting is based are well understood. For background information the reader is referred to U.S. Patent No. 3,042,857 of Vaino Ronka and U.S. Patent No. 2,623,924 of W. O. Cartier et al. It is sufficient to state that measurements of real and quadrature components of secondary fields assist in locating buried ore bodies and in estimating their worth. In practice it is often sufficient to measure only the vertical real and quadrature components of the secondary fields, and the apparatus of FIGS. 1 and 4 is particularly adapted to do this.

Referring now to FIG. 2, an electrically conductive buried ore body is indicated by reference numeral 10. The core body 10 is surrounded by rock 11 and is covered with overburden 12. Arrows 13 represent a horizontal primary field and arrows 14 represent a secondary field emanating from the ore body 10. In FIG. 3, vector $H_{xp}$ represents the primary field. The vector $H_s$ can be resolved into a horizontal component $H_{xs}$ and a vertical component $H_{zs}$ (the horizontal component $H_{ys}$ of $H_s$ that its orthogonal to $H_{xs}$ is neglected). Vector $H_t$ is the resultant of the vectors $H_{xp}$ and $H_s$ and represents the total in-phase field. Assuming that $H_{xp}$ is much larger than $H_{xs}$, the angle $\alpha$ is proportional to the amplitude of the vertical real component $H_{zs}$.

The primary field $H_{xp}$ preferably is provided by a distant electromagnetic transmitter operating in the VLF (very low frequency) band (e.g. between about 14–30 kc.). The United States Navy, for example, operates a number of powerful radio stations in the United States for communication with submarines. These stations use vertical antennas. The direction of the antenna current therefore is vertical, and the flow of antenna current produces a horizontal alternating magnetic field which penetrates deeply into the earth. In non-conductive earth, the magnetic field remains horizontal, but in the vicinity of conductors the magnetic field becomes distorted and is no longer horizontal when vertical secondary fields are present as indicated in FIG. 3.

Referring to FIGS. 1 and 4, a receiving coil 15, which constitutes directional alternating magnetic field sensing means, is coupled to a receiver 16 through a capacitor 17. The receiving coil 15 is preferably a relatively long electrostatically shielded solenoid having a magnetic core, for example, of ferrite, and it resonates with the capacitor 17 at the frequency of a selected VLF radio station. The receiving coil 15 may consist of about 800 turns. The receiver includes an amplifier 18 for amplifying voltages induced in the receiving coil 15, and a mixer 19 and oscillator 20 for converting the frequency of the output of the amplifier 18 to a convenient audio frequency, such as 1600 cycles per second. The amplifier 18 has two inputs, and voltages applied to the respective inputs are amplified differentially. If the voltages applied to each input are equal, the output of the amplifier 18 is zero. The output of the mixer 19, which is an audio voltage, is fed through a narrow band audio filter 21 tuned to the frequency of the audio voltage. The filter 21 provides additional selectivity for the receiver, and its output is fed to a headphone 22 which constitutes receiver output indicating means. The amplifier 18, mixer 19, oscillator 20 and filter 21 are conventional.

A compensating quadrature voltage is derived as follows. A reference coil 23, which is in maximum coupling with the total in-phase field, is coupled to an amplifier 24 through a capacitor 25, and it also consists of about 800 turns. The reference coil 23 is electrostatically shielded and has a magnetic core, for example, of ferrite, and it is preferably orthogonal to the receiving coil. The reference coil 23 resonates with the capacitor 25 at the frequency of the selected VLF radio station. The output of the amplifier 24 is fed to a phase shifter 26 which shifts the phase of the voltage by 90°. The phase shifted or quadrature voltage produced by the phase shifter 26 is fed to the other input of the amplifier 18 through an adjustable attenuator 27 which is adapted to control the relative level and the polarity of the quadrature voltage. The attenuator 27 is provided with a graduated scale 28. At zero on the scale 28, the level of the attenuator output voltage is zero, and at other scale positions the level of the attenuator output voltage is proportional to the reading on the scale and is proportional to the total in-phase field (see below). On one side of scale zero the attenuator output is positive, and on the other side it is negative. The circuit for the attenuator 27 is conventional and may transist of a suitably biased transistor with a potentiometer connected between the collector and emitter.

Referring now to FIG. 1, the apparatus of FIG. 4 is contained within a compact housing 29. The receiving coil 15 is contained within a relatively long tube 30 fixed at one end to the housing 29, and the reference coil 23 is contained within a relatively short tube 31 which extends at right angles from the opposite end of the tube 30. The tubes 30 and 31 are preferably of fibre glass or other non-conductive material. A manually adjustable dial 32 permits control of the output of the attenuator 27. The attenuator scale 28 consists of graduations on the outer surface of the dial 32, as shown. It is convenient to mark the scale 28 in percentages of the primary field, e.g. ±40%. A reading of + or −10%, for example, means that the level of the compensating quadrature voltage is 10% of the level of the voltage induced in the receiving coil 15 when in maximum coupling with the total in-phase field. An inclinometer 33, fixed to one side of the housing 29, permits the operator to observe the relative angle between the axis of the receiving coil 15 and the vertical. The inclinometer has a scale marked in degrees, and for convenience it preferably also has a scale marked in percentages (equal to tangent of the angle), e.g. ±150%. A 100% reading corresponds to a tilt angle of 45° and a 0% reading corresponds to the vertical. Usually the tilt angle is considerably less than 100%.

Measurements of secondary fields are made as follows. With the reference coil 23 aligned with the direction of the primary field, the tube 30 containing the receiving coil 15 (and with it the housing 29) is tilted away from the vertical until minimum receiver output is observed in the headphone 22. Then the dial 32 which controls the attenuator 27 is adjusted to further minimize the receiver output. The operator then notes the inclinometer and quadrature readings. When no vertical real component is present, the axis of the receiving coil is vertical for minimum coupling. When a vertical real component is present, however, the axis of the receiving coil for minimum coupling forms an angle $\alpha$ with the vertical (see FIG. 3). As indicated above, if $H_t \gg H_s$, then the angle $\alpha$ is proportional to the vertical real component $H_{zs}$. The angle $\alpha$ is measured by the inclinometer 33, as indicated above. An inclinometer reading of 100%, for example, means that tan $\alpha=1$, or $H_{zs}=H_{xp}$, assuming $H_{xp} \gg H_{xs}$.

The direction of the primary field is at right angles to the direction from the observer to the selected VLF radio station. The direction of survey lines is preferably parallel to the direction of the primary field. At the start of a survey the operator can use the apparatus to accurately orient himself in this respect, as follows. The receiving coil 15 is held in a horizontal plane and is turned until the output of the receiver is a minimum, indicating that the axis of the receiving coil is pointing towards the VLF radio station. The direction of the primary field is then at right angles to the axis of the receiving coil. It is advisable to select a VLF radio station that is so located that the primary field produced thereby as nearly as possible is at right angles to the main strike of the ore bodies in the area in which the survey is being made.

It is convenient to calibrate the apparatus so that when approaching an ore body the real and quadrature readings are positive. The polarity of the readings reverses as the ore body is transversed. If the operator takes a reading in a direction opposite to that of a previous reading, the polarity of the reading is reversed. When plotting the readings, care should be taken that the polarities are correct.

The following list gives the locations and frequencies of a number of VLF radio stations.

| Stations | Location | Frequency (kc.) |
|---|---|---|
| NAA | Cutler, Maine | 17.8 |
| NSF | Annapolis, Md | 21.4 |
| NPG | Seattle, Wash | 18.6 |
| WWVL | Fort Collins, Colo | 20 |
| GBR | Rugby, England | 16 |
| NPM | Hawaii | 23.4 |
| NPN | Guam | 15.3 |
| NWC | Australia | (1) |

1 Unknown at present.

The apparatus of FIG. 5 is similar to that of FIG. 4 except that an addtional attenuator 34 is provided for electronically nulling the receiving coil 15 with $H_t$. The attenuator 34 is connected directly to the output of the amplifier 24 with no phase shift, so that the output voltage of the attenuator 27 is 90° out of phase with respect to the output voltage of the attenuator 34. The attenuator 34 is similar to the attenuator 27, and the output voltage of the attenuator 34 is in phase wth the real voltage at the input of the amplifier 18. Resistances 35 and 36 isolate the attenuators 34 and 27. In operation, the attenuators 34 and 27 are individually adjusted for minimum receiver output, and the readings of their respective dials noted. The receiving coil 15 is preferably kept vertical when measurements are being made.

The apparatus of FIG. 6 is adapted to continuously record measured levels of the real and quadrature components, and the apparatus is particularly adapted for airborne use. A vertical receiving coil 37 is coupled to an amplifier 38 through a capacitor 39. The receiving coil 27 is similar to the receiving coil 15, but it is grounded through a resistor 40 of low resistance, e.g. 10 ohms. The output of the amplifier 38, which is an A.C. voltage, is fed to two conventional synchronous detectors 41 and 42. The synchronous detectors 41 and 42 detect or rectify the A.C. voltage that is applied to their respective inputs when the input voltage is in phase with a reference voltage. The level of the D.C. output of each synchronous detector 41 is proportional to the level of the A.C. voltage applied to the respective inputs, and the polarity of the D.C. outputs is the same as the polarity of the input voltages with respect to the reference voltages. In the case of the synchronous detector 41, the reference voltage is real, and in the case of the synchronous detector 42 the reference voltage is in phase quadrature with the primary field. The respective reference voltages are derived as follows. A horizontal reference coil 43 having a grounded center tap feeds the inputs of a balanced amplifier 44 through capacitors 45 and 46. The output of the amplifier 44 is connected across the fixed contacts of a potentiometer 47 and also is fed to a 90° phase shifter 48. A real reference voltage is applied to the synchronous detector 41 from the potentiometer 47 by lead 49 and a quadrature reference voltage is applied to the sychronous detector 42 by a lead 50.

The outputs of the synchronous detectors 41 and 42 are respectively fed to D.C. motors 51 and 52 which can turn in two directions, depending on the polarity of the voltage applied to them. The motor 51 has a shaft (not shown) that is mechanically coupled by suitable linkage to the rotor or movable contact of the potentiometer 47. Similarly, the shaft (not shown) of the motor 52 is mechanically coupled to the rotor of a potentiometer 53 that is connected across the output of the phase shifter 48. In addition, the rotors of the potentiometers 47 and 53 are respectively electrically connected to the junction of the receiving coils 37 and the resistor 40 through isolating resistors 54 and 55. The respective shafts of the motors 51 and 52 are also connected by means of suitable linkages to pens 56 and 57 of a conventional recorder 58 of the moving paper kind or the like.

In operation, a voltage is induced in the receiving coil 37 when vertical secondary fields are present due to an ore body, and this voltage may include both real and quadrature components. The voltage induced in the receiving coil 37 is amplified by the amplifier 38 and is detected by the synchronous detectors 41 and 42. The D.C. output of the synchronous detector 41 is proportional to the level of the A.C. voltage from the amplifier 38. The output of the synchronous detector 41 energizes the motor 51 causing the shaft of the motor 51 to turn the rotor of the potentiometer 47. A compensating real voltage from the amplifier 44 is applied to the fixed contacts of the potentiometer 47, and a portion of the compensating voltage is fed back to the receiving coil 37 from the rotor of the potentiometer 47. As the rotor rotates, the compensating voltage applied to the receiving coil 37 increases or decreases depending on the sense of rotation, thereby balancing the real voltage induced in the receiving coil 37. As a balance condition is approached, the output of the synchronous detector 41 diminishes. This causes the motor 51 to slow down and eventually stop when the output of the synchronous detector 41 has reached zero. The shaft of the motor 51 is also mechanically coupled to the pen 56 of the recorder 58, and the position of the pen 56 depends on the relative orientation of the shaft of the motor 51. When no real voltage is induced in the receiving coil 37 (i.e. when there is no $H_{sz}$ component interacting with the receiving coil 37) the pen 56 draws a straight line on the moving paper of the recorder 58. When real voltage appears at the input of the amplifier 38, however, the balance is upset and the shaft of the motor 51 rotates until balance again is achieved. The rotation of the motor shaft displaces the pen 56 and a coresponding indication is marked on the moving paper of the recorder 58. The operation of the portion of the circuit which is responsive to quadrature voltages is identical to that described above, and the result is that two traces are made on the recorder 58, one representing the value of the real component and the other representing the value of the quadrature component of the vertical field.

The apparatus described herein is particularly adapted to utilize the primary alternating magnetic field produced by a VLF radio station, but it is understood that the invention can be applied to a system utilizing other sources of electromagnetic fields, whether horizontally or vertically polarized. For example, in some cases it might be desirable to use a low frequency transmitter for energizing transmitting coil that is placed on the earth with its axis vertical. The primary magnetic field produced thereby is generally vertical, and is in maximum coupling with horizontally disposed ore bodies. The receiving coil then would be horizontal for null coupling with the primary field. In addition, other forms of magnetic field sensing devices such as semiconductors known as Hall effect devices could be used instead of the receiving and reference coils described above. For example, a Hall effect device could be located in a narrow gap between two aligned rods of ferrite or other magnetic material acting as magnetic field concentrators.

In addition, other alternating magnetic field components could be measured by suitably changing the orientation of the coils. For example, two horizontal coils could be used to measure the vertical gradient of the real and quadrature components of the horizontal secondary field.

What I claim as my invention is:

1. Electromagnetic prospecting apparatus for measuring real and quadrature components of secondary alternating magnetic fields emanating from buried ore bodies when they are intersected by a primary alternating magnetic field, the primary field being produced by a distant electromagnetic transmitter of predetermined frequency, said apparatus comprising:

first directional alternating magnetic field sensing means having an axis, a receiver that is coupled to the field sensing means, the receiver being responsive to voltages that are induced in the field sensing means due to the presence of said real and quadrature components of secondary fields, means for indicating the output of the receiver, the output of the receiver being a minimum when the field sensing means is in null coupling with the resultant of the primary magnetic field and the real component of the secondary field at a given location, measuring means for indicating the inclination of the axis of the field sensing means when it is in null coupling with said resultant, means, including second directional alternating magnetic field sensing means having an axis angularly displaced with respect to the axis of said first field sensing means, for deriving a compensating quadrature voltage, means for balancing the voltage induced in the first field sensing means due to said quadrature components with a selected amplitude of said compensating quadrature voltage to thereby produce a further minimum in the output of the receiver, and means for measuring the amplitude of said compensating quardature voltage.

2. Electromagnetic prospecting apparatus as claimed in claim 1 wherein the first field sensing means is a relatively long electrostatically shielded solenoid having a magnetic core.

3. Electromagnetic prospecting apparatus as claimed in claim 2 wherein said second directional alternating magnetic field sensing means is an electrostatically shielded reference coil having a magnetic core, said coil being coupled to the primary field, and wherein the means for deriving a compensating quadrature voltage further includes an amplifier that is connected to said coil, and means for shifting the phase of the output voltage of said amplifier by 90° to provide the compensating quadrature voltage.

4. Electromagnetic prospecting apparatus as claimed in claim 2 wherein said distant electromagnetic transmitter is a very low frequency radio transmitter operating in the band between about 14–30 kc. and having a vertical antenna; wherein the receiver comprises an amplifier that is tuned to the frequency of said radio station, and means for converting the frequency of the output of said amplifier to an audio frequency.

5. Electromagnetic prospecting apparatus as claimed in claim 3 wherein said distant electromagnetic transmitter is a very low frequency radio transmitter operating in the band between about 14–30 kc. and having a vertical antenna; wherein the receiver comprises an amplifier that is tuned to the frequency of said radio station, and means for converting the frequency of the output of said amplifier to an audio frequency; wherein the receiver output indicating means is a headphone; and wherein the measuring means is an inclinometer that is adapted to measure the angle between the axis of the first field sensing means and the vertical.

6. Electromagnetic prospecting apparatus for measuring real and quadrature components of secondary alternating magnetic fields emanating from buried ore bodies when they are intersected by a primary alternating magnetic field, the primary field being produced by a distant electromagnetic transmitter of predetermined frequency, said apparatus comprising;
   first directional alternating magnetic field sensing means having an axis,
   a receiver that is coupled to the field sensing means, the receiver being responsive to voltages that are induced in the field sensing means due to the presence of real and quadrature components of said secondary fields,
   means for indicating the output of the receiver,
   means, including second directional alternating magnetic field sensing means having an axis angularly displaced with respect to the axis of said first field sensing means, for deriving a compensating real voltage and compensating quadrature voltage of adjustable amplitudes,
   means for balancing the voltage induced in the first field sensing means with a selected amplitude of said compensating real voltage and with a selected amplitude of said compensating quadrature voltage, and
   means for individually measuring the amplitudes of said compensating real and quadrature voltages.

7. Electromagnetic prospecting apparatus as claimed in claim 6 wherein the first field sensing means is a relatively long electrostatically shielded solenoid having a magnetic core.

8. Electromagnetic prospecting apparatus as claimed in claim 7 wherein said second directional alternating magnetic field sensing means is an electrostatically shielded reference coil having a magnetic core and wherein the means for deriving a compensating real voltage and a compensating quadrature voltage further includes an amplifier that is connected to the coil and tuned to the frequency of said transmitter, first circuit means for feeding signals from the amplifier to the balancing means, and second circuit means including a phase shifter for feeding signals from the amplifier to the balancing means after said signals have been shifted 90° in phase.

9. Electromagnetic prospecting apparatus for measuring real and quadrature components of secondary alternating magnetic fields emanating from buried ore bodies when they are intersected by a primary alternating magnetic field, the primary field being produced by a distant electromagnetic transmitter of predetermined frequency, said apparatus comprising:
   first directional alternating magnetic field sensing means having an axis,
   an amplifier that is coupled to the field sensing means, the amplifier being responsive to voltages that are induced in the field sensing means due to the presence of said real and quadrature components of secondary fields,
   first and second synchronous detectors connected to the amplifier for respectively rectifying said induced voltages, means, including a second directional alternating magnetic field sensing means having an axis angularly displaced with respect to the axis of said first field sensing means, for deriving a compensating real voltage and for deriving a compensating quadrature voltage,
   means responsive to the output of the first and second synchronous detectors for automatically balancing the voltages induced in the field sensing means with measured percentages of said compensating real and kuadrature voltages, and
   recorder means connected to said balancing means, said recorder having first and second recording channels for respectively indicating the selected percentages of said compensating real and quadrature voltages.

10. Electromagnetic prospecting apparatus as claimed in claim 9 wherein the balancing means includes first and second electric motors that are respectively energized by the outputs of the first and second synchronous detectors, a first potentiometer connected to said real voltage compensating means, a second potentiometer connected to said quadrature voltage compensating means, said first potentiometer being controlled by said first motor, and said second potentiometer being controlled by said second motor.

11. Electromagnetic prospecting apparatus as claimed in claim 9 wherein said distant electromagnetic transmitter is a very low frequency radio transmitter operating in the band between about 14–30 kc. and having a vertical antenna.

12. Electromagnetic prospecting apparatus as claimed in claim 10 wherein said distant electromagnetic transmitter is a very low frequency radio transmitter operating in the band between about 14–30 kc. and having a vertical antenna.

References Cited

UNITED STATES PATENTS

| | | | |
|---|---|---|---|
| 2,471,105 | 5/1949 | Gustafsson et al. | 324—34 XR |
| 3,351,852 | 11/1967 | Libby | 324—40 |
| 2,268,106 | 12/1941 | Blau | 324—6 |
| 2,558,972 | 7/1951 | McLaughlin et al. | 324—8 |
| 2,929,984 | 3/1960 | Puranen et al. | 324—6 |
| 2,995,699 | 8/1961 | Snelling et al. | 324—6 XR |
| 3,065,407 | 11/1962 | Huddleston et al. | 324—6 |
| 3,108,220 | 10/1963 | Ruddock | 324—6 |
| 3,085,197 | 4/1963 | Hings | 324—8 |
| 3,123,766 | 3/1964 | Ruddock et al. | 324—6 XR |
| 3,214,686 | 10/1965 | Elliot et al. | 324—6 |

GERARD R. STRECKER, Primary Examiner

U.S. Cl. X.R.

324—7